United States Patent [19] [11] 4,357,190
Fouss et al. [45] Nov. 2, 1982

[54] METHOD AND APPARATUS FOR MANUFACTURING NON-ROUND PLASTIC TUBING

[75] Inventors: James L. Fouss; John J. Parker, both of Findlay, Ohio; Donald W. Sting, 358 Turtleback Rd., New Canaan, Conn.

[73] Assignee: Hancor, Inc., Findlay, Ohio

[21] Appl. No.: 162,006

[22] Filed: Jun. 23, 1980

Related U.S. Application Data

[63] Continuation-in-part of Ser. No. 967,514, Dec. 7, 1978, Pat. No. 4,245,924.

[51] Int. Cl.³ .............................................. B29C 29/08
[52] U.S. Cl. ........................... 156/244.13; 156/244.18; 156/252; 156/259; 156/264; 156/292; 156/308.2; 156/500; 156/517; 156/519
[58] Field of Search ........... 156/198, 216, 217, 244.13, 156/244.15, 244.18, 259, 264, 292, 252, 308.2, 324, 461, 500, 497, 513, 517, 519; 264/146, 509, 209, 257, 508, 565; 428/188, 167, 36; 425/296, 303, 396; 138/121

[56] References Cited

U.S. PATENT DOCUMENTS

| | | | |
|---|---|---|---|
| 1,606,270 | 11/1926 | Stratford | 156/244.18 |
| 2,614,953 | 10/1952 | Anglada | 156/308.4 |
| 2,632,724 | 3/1953 | Lumbard | 156/292 |
| 2,702,410 | 2/1955 | Brown | 18/48 |
| 3,248,463 | 4/1966 | Wiley et al. | 264/95 |
| 3,280,430 | 10/1966 | Antrobus | 18/14 |
| 3,349,156 | 10/1967 | Zieg | 264/99 |
| 3,479,419 | 11/1969 | Hochhauser | 264/25 |
| 3,558,410 | 1/1971 | Quackenbush et al. | 264/209 |
| 3,579,402 | 5/1971 | Goldsworthy et al. | 156/392 |
| 3,650,868 | 3/1972 | Murota | 156/203 |
| 3,705,779 | 12/1972 | Zon | 425/326 |
| 3,799,418 | 3/1974 | Maroschak | 226/6 |
| 3,809,593 | 3/1974 | Burke et al. | 156/259 |
| 3,843,758 | 10/1974 | Maroschak | 264/40 |
| 3,854,527 | 12/1974 | Maroschak | 165/120 |
| 3,864,446 | 2/1975 | Maroschak | 264/95 |
| 3,870,774 | 3/1975 | Maroschak | 264/40 |
| 3,871,807 | 3/1975 | Meyniel et al. | 425/326 R |
| 3,877,831 | 4/1975 | Maroschak | 408/32 |
| 3,892,514 | 7/1975 | Nordstrom | 425/308 |
| 3,893,465 | 7/1975 | Cheatwood | 134/122 |
| 3,910,713 | 10/1975 | Maroschak | 408/1 |
| 3,916,763 | 11/1975 | Maroschak | 90/15.1 |
| 3,990,827 | 11/1976 | Maroschak | 425/302 B |
| 4,003,122 | 1/1977 | Overmyer et al. | 29/429 |
| 4,003,685 | 1/1977 | Maroschak | 425/135 |
| 4,112,810 | 9/1978 | Dreibelbis | . |
| 4,115,495 | 9/1978 | Hartitz | 264/159 |
| 4,124,426 | 11/1978 | Saul | 156/198 |
| 4,192,699 | 3/1980 | Lewicki et al. | 156/292 |
| 4,194,081 | 3/1980 | Medford et al. | 156/244.18 |
| 4,222,807 | 9/1980 | Farber | 156/244.18 |
| 4,245,924 | 12/1981 | Fouss et al. | 138/121 |

FOREIGN PATENT DOCUMENTS

52-10363 1/1977 Japan .................................. 264/146

*Primary Examiner*—Jerome W. Massie
*Attorney, Agent, or Firm*—Fay & Sharpe

[57] ABSTRACT

This application discloses the method and apparatus for manufacturing plastic tubing which comprises a rigid semiround, triangular, or the like top section and a flat base of flexible sheet-like material. The manufacturing comprises the steps of or apparatus for (a) extruding a sleeve of thermoplastic material, (b) blow molding a corrugated generally tubular structure, (c) cooling the generally tubular structure, (d) splitting the generally tubular structure into a pair of semiround corrugated tubing structures, (e) bonding a strip of sheet-like material across the open base of the semiround tubing, (f) folding the semiround tubing longitudinally to a flattened configuration, and (g) coiling the tubing in its flattened configuration.

32 Claims, 7 Drawing Figures

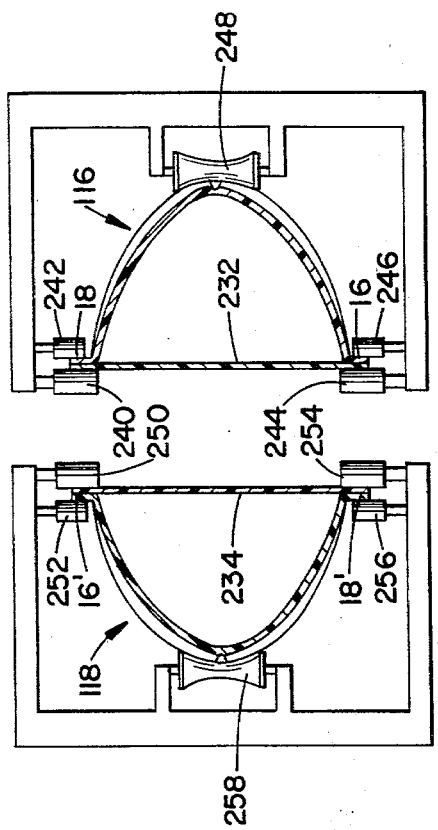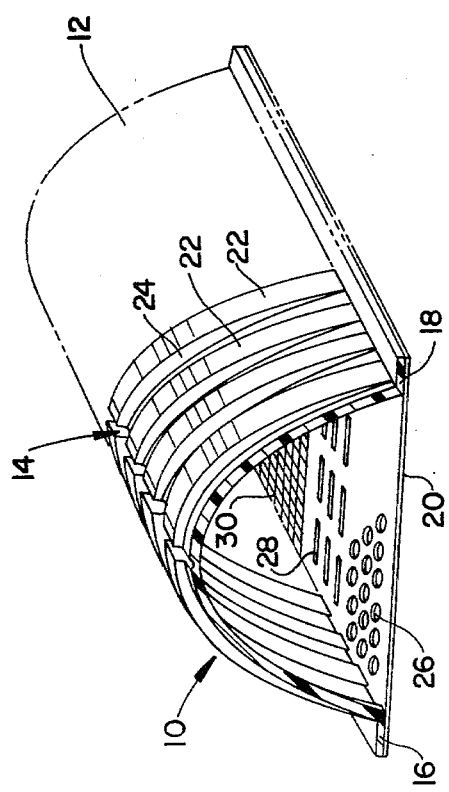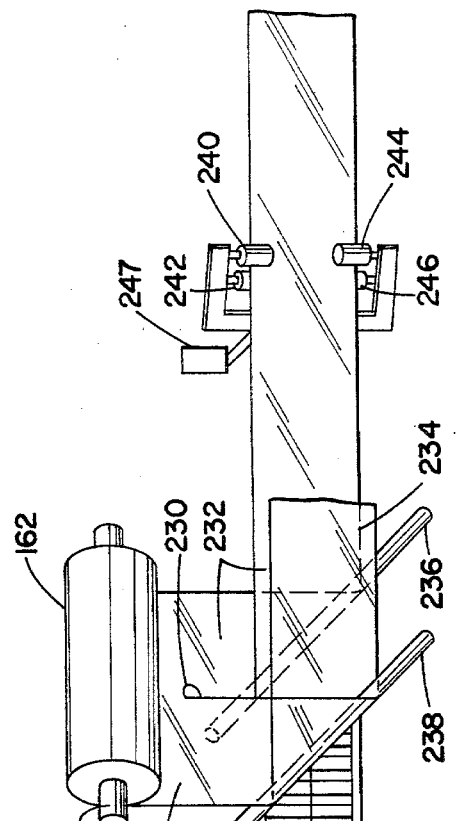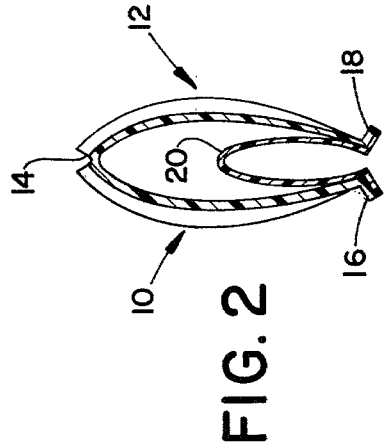

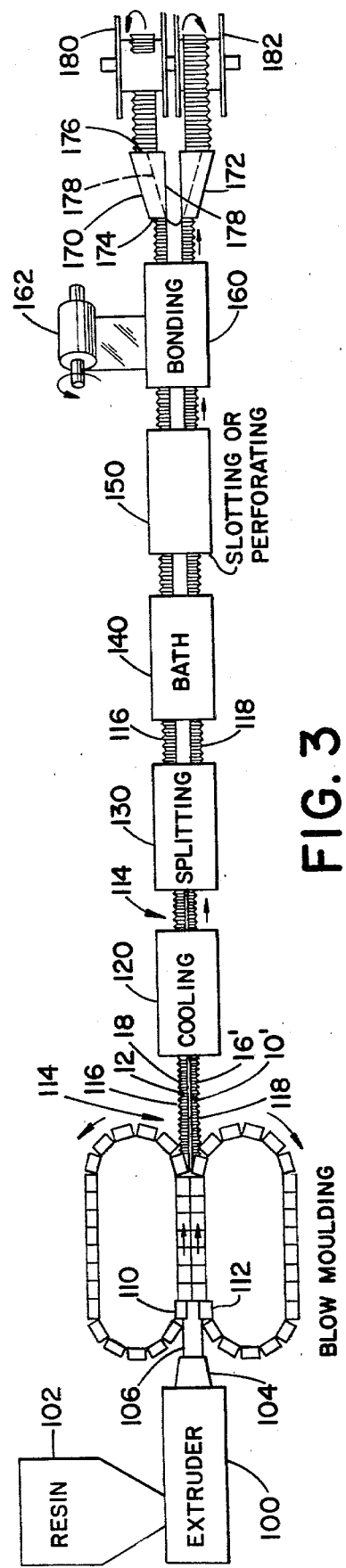

METHOD AND APPARATUS FOR MANUFACTURING NON-ROUND PLASTIC TUBING

This application is a continuation-in-part of application Ser. No. 967,514, filed Dec. 7, 1978, now U.S. Pat. No. 4,245,924, issued Jan. 20, 1981.

BACKGROUND OF THE INVENTION

This application pertains to the art of manufacturing plastic tubing and more particularly to the art of manufacturing corrugated semiround plastic tubing, conduit, or pipe. The invention is particularly applicable to corrugated plastic drainage tubing and will be described with particular reference thereto. It will be appreciated, however, that the invention has broader applications, such as manufacturing septic and leach bed tubings, subterranean conduit, other fluid conveying channels, pipes for shielding electrical conduit, and the like.

In the past, most corrugated drainage tubing has been circular in cross-section. The circular tubing is generally manufactured in linear production line assembly. Commonly, a plastic extruding machine fitted with a circular extrusion die receives pellets of thermoplastic material and extrudes a plastic sleeve through the die. The extruder subjects the pellets to a combination of heat and pressure to soften the pellets to a plastic state. Closely adjacent the extruder die is positioned a continuous blow molding assembly. Often the blow molding assembly includes pairs of mold blocks arranged in two continuous loops. Adjacent the extruding die, each pair of mold blocks abuts together to define a circular corrugated mold. The mold blocks then travel linearly along a path as the sleeve is forced with pneumatic pressure to conform to the shape of the interior surface of the mold blocks. While the mold blocks of each pair are abutting each other and traveling in contact with the tubing, the plastic material cools sufficiently that it retains its molded shape. The mold blocks then separate and return to the initial position.

After the tubing is molded, it is generally cooled with a water bath to make the plastic sufficiently hard for slotting or drilling operations. If the tubing is to be used for drainage tubing, the continuous length of tubing is commonly conveyed adjacent a slotting saw which cuts a series of thin clots into the side walls of the tubing. If the tubing is to be used for septic tubing, the tubing is commonly conveyed through a drilling machine which drills round holes about ¾" in diameter into the side walls of the tubing. If the tubing is to be used for conveying fluids, generally, it is not slotted or drilled. Further, if the tubing is to be used for drainage tubing, it is sometimes wrapped with a filter material. This filter material may be applied in several manners. One common method of application is to wrap the tubing from a continuous sheet of filter material and seal the edges of the filter material together such that tubing is encased within a sleeve of the filter material. The plastic tubing, with or without the filter wrap, is commonly cut in ten foot lengths or coiled in 250 foot rolls. An alternate method for applying filter material to corrugated plastic tubing is to insert the end of the tubing into a bunched 250 foot sleeve of filter material. As the tubing is coiled, the sleeve is unbunched and fed smoothly over the tubing. Alternately filter material can be applied as the tubing is installed in the ground. Numerous patents illustrate the conventional methods for the manufacture of corrugated plastic tubing. See for example, U.S. Pat. Nos. 3,732,046, issued May 8, 1973 to R. C. Martin; 3,819,778, issued June 25, 1974 to E. J. Maroschak; 3,843,758, issued Oct. 22, 1974 to E. J. Maroschak; and 3,990,827, issued Nov. 9, 1976 to E. J. Maroschak.

One of the problems with the prior art apparatus and method for manufacturing corrugated plastic tubing is that only a single length of tubing is manufactured on each production line.

Another problem with the prior art manufacturing techniques is the difficulty encountered when drilling or slotting moving lengths of continuous plastic tubing.

Yet another problem with the prior art manufacturing apparatus and method is the difficulty encountered in adding and handling filter materials to the tubing. Filter wrapped materials applied during manufacture to the exterior of the tubing are very vulnerable to abrasion and puncture during storage, shipment, and installation. Application of filter material at installation, see for example U.S. Pat. No. 4,003,122, issued Jan. 18, 1977 to R. C. Overmyer, makes the installation process slower and more cumbersome.

SUMMARY OF THE INVENTION

The present invention contemplates a new and improved method and apparatus for manufacturing plastic tubing which overcomes all of the above referenced problems and others yet provides an apparatus and method for manufacturing of plastic tubing which is simpler, more economical, and faster than the prior art.

In accordance with the present invention, there is provided a method and apparatus for manufacturing a plurality of plastic tubes in a single assembly line.

In accordance with more limited aspect of the invention, there is provided a method of manufacturing semiround plastic tubing which comprises the steps of extruding a sleeve of thermoplastic material, molding the sleeve into a rounded generally tubular structure, and splitting the generally tubular structure to form a plurality of separate semiround tubing structures.

In accordance with another aspect of the invention, there is provided the apparatus for manufacturing plastic tubing structures which are relatively rigid in cross section. The apparatus includes a molding means for molding a generally tubular structure which comprises at least two tubing structures that are longitudinally connected along terminal edges. The apparatus further includes splitting means for splitting the generally tubular structures apart adjacent the connected terminal edges. In this manner, the generally tubular structure is split into at least two tubing structures.

In accordance with a more limited aspect of the invention, the method and apparatus may further include the steps of or the means for bonding sheet-like material across the terminal edges to form a base for the tubing structure. The sheet-like material may be a flexible plastic strip which optionally may be slitted or perforated or may be a filter material.

In accordance with a yet more limited aspect of the invention, the method and apparatus may further include the steps of or means for folding the tubing structure into a generally flat configuration with a sheet-like material folded inside the side walls of the tubing structure and coiling the folded tubing structure into rolls.

The principle advantage of the invention is that it allows a plurality of tubing structures to be formed on a single assembly line. The present invention increases the speed of production and decreases the cost and amount of manufacturing equipment.

Another advantage of the invention is that is produces corrugated tubing with ingress or egress apertures or filter screens without stopping a section of corrugated tubing for slotting or drilling purposes. The invention further protects the filter screen during shipment.

BRIEF DESCRIPTION OF THE FIGURES

FIG. 1 illustrates a semiround corrugated tubing structure manufactured in accordance with the method or apparatus of the present invention;

FIG. 2 illustrates a cross section of the tubing structure of FIG. 1 in a folded configuration.

FIG. 3 is a block diagram of the steps of or means for manufacturing plastic tubing in accordance with the present invention;

FIG. 4 is further illustrative of the molding blocks for use in conjunction with the molding technique of FIG. 3;

FIG. 5 is further illustrative of the splitting technique of FIG. 3;

FIG. 6 is further illustrative of the bonding technique of FIG. 3; and

FIG. 7 is further illustrative of the bonding technique of FIG. 3.

DESCRIPTION OF THE PREFERRED EMBODIMENT

Reference is now made to the drawings which are for the purpose of illustrating a preferred embodiment of the invention only and not for the purposes of limiting the invention.

The present invention is applicable to manufacturing numerous shapes and styles of tubing. It may be used to manufacture semiround tubing including parabolic, semielliptical, semicircular and the like, rectilinear tubing including triangular, rectangular or the like, and many other geometric cross sections of hollow tubing structures which have a flat base area. The tubing has a hollow channel extending longitudinally along the tubing to allow fluids and the like to be conveyed through the tubing. The hollow is generally formed as a result of a U- or V-shaped cross section of the tubing. The tubing may have an integral base to provide a closed circumference or the supporting earth or other structure at the installation site may supply the bottom surface of the channel defined by the tubing structure. In the preferred embodiment, the tubing structure has an arched, particularly a parabolically arched, cross section.

FIGS. 1 and 2 are illustrative of a preferred embodiment of the tubing structure which may be manufactured with the present invention. The tubing structure is an elongated conduit comprised of a pair of cooperatively spaced side walls 10 and 12. Th side walls are pivotally connected longitudinally at an apex area by a connecting or hinge means 14. The hinge means is included so that the tubing structure is longitudinally foldable. A plurality of hinges, such as at the corners of a trapezoid, are also contemplated by the hinge means. If the tubing is not to be folded, then hinge means may be deleted. Opposite their interconnection by the hinge means, side walls 10 and 12 each have longitudinally extending terminal edge areas 16 and 18 respectively. The terminal edges each have a bearing surface to which a base 20 is attached and upon which the tubing structure and any supported load, such as backfill, rest.

In the preferred embodiment, each of the side walls 10 and 12 are formed with a plurality of transverse peaks 22 and valleys 24 to form corrugations thereon. Smooth walled tubing is also contemplated to be within the present invention. The side walls are formed of a strong rigid thermoplastic material such as polyethylene, ABS, styrene polymers, polyvinyl chloride, or the like. The height of the corrugations and the thickness of the plastic are chosen such that when the tubing is installed in a subterranean instllation, there will be sufficient strength to withstand loading forces from back fill and hydrostatic loading forces from ground water. In the preferred embodiment, the side walls 10 and 12 taken together in the unfolded configuration form a parabolic arch, because the parabolic cross section has preferred strength characteristics. Alternately, the side walls may form other semiround or rectilinear structures and the like. Semiround, it will be appreciated, connotes a generally rounded structure with a generally flat base. It should be construed broadly to include a structure having rounded or curved segments or rectilinear approximations of rounded or curved segments.

When the tubing is installed in a subterranean location, a base 20 generally rests on the floor of a trench or other earthen surface. Thus, the base is supported by the ground. Accordingly, the base 20 need not be constructed with sufficient strength to support the conveyed liquids by itself. Rather the ground and base together support the conveyed liquids. Under distributed vertical loading from back fill, the semiround wall structure tends to flatten. The terminal edge areas 16 and 18 tend to be forced apart by this loading force. Accordingly, base 20 should be a material with a sufficiently high tensil strength that under normal loading conditions it constrains the terminal edges of the side walls from moving apart. A suitable material for base 20 is a ten to fifteen mil polyethylene sheet. The polyethylene sheet may be a solid plastic for conveying fluids or may be perforated to allow fluid egress or ingress. For example, the sheet-like material may be perforated with $\frac{1}{8}''$ diameter holes as shown at 26, slotted as shown at 28, or punched with holes of various other sizes and configurations. The base may be made of various polymeric materials, mylar, metallic foils, and the like. Alternately, the base may be made of a porous material such as a spun bonded fabric, e.g. Dupont's TYPAR spunbonded polypropylene material, plastic coated fiber glass screening, or other filter or screening materials. The use of porous filter materials is advantageous in drainage situations. The filter or screening materials allow the water to enter the hollow of the tubing structure but block sand and other particles which might tend to clog or fill the tubing. Further, the sheet-like material which forms the base is foldable to enable the tubing structure to be folded about hinge means 14. As the terminal edge areas 16 and 18 of the tubing are brought together, FIG. 2, a generally flat, folded configuration is formed. As the side walls 10 and 12 are folded together, the base 20 is folded into the interior of the tubing. The relatively rigid side walls protect the relatively flexible base from abrasion, punctures, and the like while in its folded configuration.

FIG. 3 is illustrative of the apparatus and method of producing generally flat based tubing structures. The first step in the manufacturing process is the extrusion of a sleeve of plastic material. The extrusion step is performed with an extruder 100 which receives pellets of plastic resin from a resin hopper 102 and subjects the resin to heat and pressure. Under the heat and pressure the plastic is softened and forced through an extrusion die 104 which conforms generally to the shape of the tubing which is to be produced. In the present embodiment, an oval die configuration is preferred. This produces a smooth, oval sleeve 106 of soft plastic material emerging from the extrusion die 104.

The second step of the manufacturing process is molding the extruded sleeve 106 into the desired configuration. Molding is performed with a continuous blow molding means which comprises a plurality of pairs of mold blocks which move in two continuous runs. By way of explanation, adjacent the extruder 100 a pair 110 and 112 of the many pairs of mold blocks come together and abut. The mold blocks then move linearly away from the extruder at substantially the rate sleeve 106 is extruded. Interior to the extruded plastic sleeve is a pneumatic means for exerting sufficient pneumatic pressure on the soft plastic to force it to conform with the interior surface of the mold blocks. As the mold blocks move in contact with the sleeve, sufficient heat is lost from the plastic that the plastic retains the shape of the mold blocks. After the plastic is cooled to a generally semirigid state, the mold blocks separate allowing a plastic generally tubular structure 114 to emerge. In operation, the mold blocks circulate continuously forming the soft plastic sleeve into a semirigid, generally tubular structure. In the preferred embodiment, the generally tubular structure 114 comprises a pair of corrugated, semiround tubing structures, 116 and 118, each shown in FIG. 1 and attached adjacent their terminal edge areas 16 and 18. The exact configuration of the tubing structure is, of course, determined by the mold blocks which are chosen to be used. The preferred embodiment of the mold blocks is described below in reference to FIG. 4. Alternately more than two tubing structures may be joined to form the generally tubular structure, the tubing structures may be smooth walled, or the tubing structure may have other cross sections than semiround.

The next step is cooling the plastic generally tubular structure 114 to bring it to a more rigid state. A cooling means 120 removes heat from the tubular structure. Numerous conventional cooling means may be used, such as a spray of cool water and air.

The next step is splitting the generally tubular structure into a plurality of tubing structures with a splitting means 130. In the preferred embodiment, the splitting means cuts the corrugated, generally tubular structure 114 longitudinally to form a pair of corrugated, semiround tubing structures 116 and 118.

Once the generally tubular structure is split into two separate, semiround tubing structures, cooling fluid may be readily applied to the interior as well as the exterior surfaces. The tubing structures may be submerged in a water bath 140 to cool and set the plastic more fully. Other cooling means may alternately be employed.

After the tubing structures 116 and 118 have been cooled, they may optionally be drilled or slotted. Accordingly, a slotting saw or drilling means 150 may cut slots or drill perforations into the side walls of the tubing structures 116 and 118. Slotted or perforated side walls in addition to or instead of the base may be desirable for same applications.

The next step is bonding the base 20 adjacent the terminal edge areas of the tubing structures 116 and 118. A bonding means 160 fastens a strip 162 of sheet-like material across the terminal edges 16 and 18 of the tubing structures 116 and 118. In the preferred embodiment, the bonding means heat seals a plastic sheet-like material to the bearing surfaces of terminal edges 16 and 18. Alternately, the sheet-like material may be attached by gluing, sewing, solvent welding, or other bonding techniques.

The next step is to fold the tubing into its generally flat or folded configuration. A pair of folding means 170 and 172 fold the tubing structures 116 and 118. Each of the folding means have a receiving end 174 which is dimensioned substantially in conformance with the cross sectional area of the tubing structure in its open configuration (FIG. 1) and a terminal end 176 which is configured substantially in conformance with the tubing in its flat, folded configuration (FIG. 2). Between the receiving end 174 and the terminal end 176, the folding means 170 tapers gradually from the one configuration to the other. This forces the terminal edges 16 and 18 of two side walls together. Further, a projection 178 folds the sheet-like base 20 into the interior of the tubing structure between the side walls in its folded configuration. Projection 178 is substantially flat at receiving end 174 and gradually increases to a height of approximately half the width of the base. In this manner as the terminal edges of the side walls are brought together, projection 178 merges base 20 into the interior of the tubing.

The last step is to coil the folded tubing structures. A pair of coiling means 180 and 182 wraps the flattened tubing structure onto spindles or reels. In the preferred embodiment, coiling means 180 and coiling means 182 rotate in opposite directions. Because the flattened tubing structures 116 and 118, in the preferred embodiment face in opposite directions, coiling the flattened structures in opposite directions causes all coils to look the same. After a preselected length of tubing is coiled, the tubing is cut and the new coil is started. Alternately, the tubing may be cut in shorter lengths, such as 10 foot lengths, bundled and stacked.

FIG. 4 illustrates mold blocks 110 and 112 of FIG. 3 in greater detail. Mold blocks 110 and 112 are mirror images of each other. Accordingly, only mold block 110 will be described in detail and it will be understood that the description applies similarly to mold block 112 and the other mold blocks. The mold block 110 has a series of raised and recessed areas around the inside surface 200 to form the valleys and peaks respectively, of the side walls 10 and 12 of the corrugated tubing. Disposed at the center of mold block 110 is a ridge 202 for forming hinge means 14 at the apex area of the tubing structure. Adjacent the abutting edges of mold block 110 is a ledge 204 and a ledge 206 for forming flanges adjacent terminal edge areas 16 and 18, respectively.

The mold blocks may take various alternative forms. For example, the blocks may be configured to form the semiround conduits top and bottom instead of side by side. This may be accomplished by spacing half of ridge 202 adjacent the top of the mold block where ledge 204 is disposed and positioning half of ridge 202 adjacent the bottom of the mold block where ledge 206 is disposed. A recess commensurate in size with ledges 204 and 206 may be disposed where hinge 202 is disposed. As another alternative, the interior of the mold blocks need not conform exactly to the configuration of the tubing as shown in FIG. 1. Rather the tubing may be formed with side walls 10 and 12 flexed inward or outward from the unfolded configuration. The maximum divergence of the side walls 10 and 12 about the hinge means may be set by bonding means 160. As yet another alternative, the mold blocks may form a generally tubular structure which is configured to be cut into three or more tubing structures. A larger number of mold blocks may be advantageous when larger numbers of tubing structures are molded simultaneously to decrease interference between the mold and tubing structures as the mold blocks are separated.

Splitting the generally tubular structure into a plurality of tubular structures may be performed by many well known methods. In the preferred embodiment, flanges formed by ledges 204 and 206 of the mold blocks are cut. As illustrated in FIG. 5, generally tubular structure 114 is formed of two semiround tubing structures 116 and 118. Tubing structure 116 is marked with the reference numerals of FIGS. 1 and 2 and tubing structure 118 is marked with the same reference numerals followed by a prime ('). The terminal edge areas 16 of tubing 116 and 18' of tubing 118 are integrally molded as a rounded flange. Similarly terminal edge areas 16' and 18 are integrally molded to form a second flange. A pair of saw blades 220 and 222 are disposed sufficiently adjacent the generally tubular structure 114 as it is fed through splitting means 130 that the two flanges are severed. Saw blades 220 and 222 are disposed to cut substantially parallel to each other and perpendicular to the bases of the tubing structures 116 and 118. The saw blades 220 and 222 may be rotating blades, band saws, oscillating blades, or the like. Further, other cutting means such as knife blades, heated blades, or the like may be used. A weakened area may be molded into the flanges to facilitate the severing operation. The cutting blades may be disposed at other orientations such as parallel to the base of semiround tubing structures 116 and 118.

Cooling means 140 may be any of a variety of conventionally available structures. One such structure would be a trough or vat of water with rollers to guide the tubing below the surface. Blowers may be used to dry the tubing, if desired. The optional slotting of perforating operation at 150 may be performed with any of a variety of commercially available slotting saws or drilling tools which are well known in the art.

With reference to FIGS. 6 and 7 the bonding step in the preferred embodiment is performed by extruding a thin bead of plastic material and pressing it between a strip of sheet-like plastic material and the terminal edge areas of the semiround tubing structures. The two semiround tubing structures 116 and 118 are continuously fed through the bonding area. In the bonding area, roll 162 feeds sheet-like material at the same rate as the tubing structures 116 and 118 are advancing. Adjacent the roll of plastic material is a slitter blade 230 which splits the plastic material from the roll into two strips 232 and 234 of equal width. Alternately, of course, slitter blade 230 may be replaced with other cutting tools or two rolls of sheet-like material. A pair of bars disposed at generally 45 degree angles to the path of travel of the tubing structures acts as means for aligning strips 232 and 234 in parallel with the two tubing structures 116 and 118. The sheets 232 and 234 advance between the tubing structures 116 and 118 and parallel thereto. Looking to sheet 232, by way of example, a first pair of rollers 240 and 242 press sheet-like material 232 against the bearing surface of the terminal edge 18 of tubing structure 116. Similarly, a second pair of rollers 244 and 246 press sheet 232 against terminal edge 16 of tubing structure 116. Rollers 240 and 244 are heated to soften and heat seal the sheet 232 to terminal edges 16 and 18. Alternately, a source 247 of heat softened or melted polyethylene or other plastic material, glue, solvent, or the like may be disposed to deposit a small ribbon or bead of glue or solvent between sheet 232 and terminal edges 16 and 18. A sonic welder, sewing device, or other bonding means may also be used. A roller 248 coacts with rollers 240, 242, 244, and 246 to constrain the spread of terminal edges 16 and 18 to the desired cross section of tubing structure 116 as sheet 232 is bonded to them. This fixes the unfolded configuration of the tubing structure. Alternately, bonding may be carried out when the side walls are pivoted inward about the hinge means if the sheet 232 is folded by a corresponding amount. It is desireable for the resultant structure to have a uniform cross-sectional area.

Similarly, sheet 234 is bonded with tubing structure 118 with a fist pair of rollers 250 and 252 and second pair of rollers 254 and 256 which interact with a roller 258 to adjust the cross section of the semiround tubing structure. As an alternative, rollers 240 and 250 may be replaced by a single heating unit against which rollers 242 and 252 press the two terminal edges and the associated sheets. Similarly, rollers 244 and 254 can be replaced by a single heating structure.

The invention has been described with reference to the preferred embodiment. Clearly modifications, alterations, and various detailed implementations of some of the steps will occur to others upon the reading and understanding of this specification. It is our intention to include all such modifications, alterations, and further details insofar as they come within the scope of the appended claims or the equivalents thereof.

We claim:

1. A method of concurrently manufacturing a plurality of semiround plastic tubing structures comprising:
   continuously extruding a sleeve of plastic material;
   continuously molding the extruded sleeve into a rounded generally tubular structure;
   continuously splitting the rounded generally tubular structure longitudinally into a plurality of semiround tubing structures, each semiround tubing structure having longitudinal terminal edge areas adjacent the longitudinal split; and
   continuously attaching a preformed, elongated strip of sheet-like material longitudinally adjacent said terminal edge areas of at last one of the semiround tubing structures.

2. The method as set forth in claim 1 wherein the molding step includes molding a plurality of hinge means in the rounded generally tubular structure at such an orientation that after the splitting step the hinge means are disposed at the apex of each semiround tubing structure and further including the step of folding each semiround tubing structure generally along its hinge means to fold the tubing structure into a folded configuration.

3. The method as set forth in claim 2 further including the step of coiling each semiround tubing structure in its folded configuration.

4. A method of concurrently manufacturing a plurality of plastic tubing structures comprising:
   molding a corrugated generally tubular structure;
   splitting the molded generally tubular structure longitudinally into a plurality of tubing structures, each tubing structure having terminal edge areas adjacent the longitudinal split and corrugated side walls disposed between the terminal edge areas; and attaching a generally flat base longitudinally, generally along the terminal edge areas of each corrugated tubing structure.

5. The method as set forth in claim 4 wherein said attaching step further comprises heat sealing plastic sheet material base along the terminal edge areas.

6. The method as set forth in claim 5 wherein said plastic sheet material is porous.

7. The method as set forth in claim 4 wherein the attaching step further comprises splitting a single width of plastic material to form a plurality of strips, each strip being the generally flat base which is attached to the terminal edge areas of a corresponding one of the tubing structures.

8. The method as set forth in claim 4 wherein the attaching step further comprises applying a bead of melted plastic between the flat base and the terminal edge areas.

9. The method as set forth in claim 4 wherein the molding step further comprises molding the tubular structure with a rounded cross section, the tubular structure comprising a plurality of longitudinally interconnected curved side walls.

10. The method as set forth in claim 9 wherein the molding step further comprises molding the tubular structure with longitudinal flanges joining the terminal edge areas of some interconnected side walls.

11. The method as set forth in claim 10, wherein said splitting step further comprises cutting the flanges longitudinally, whereby the rounded, generally tubular structure is divided longitudinally into a plurality of semiround tubing structures.

12. The method as set forth in claim 9 wherein the molding step further comprises molding a longitudinal hinge between and interconnecting pairs of adjacent side walls, each side wall being connected with one adjacent side wall by the hinge and being connected with another adjacent side wall adjacent its terminal edge area.

13. The method as set forth in claim 12 wherein the attaching step further comprises attaching a strip of flexible material along the terminal edge areas of each tubing structure.

14. The method as set forth in claim 13 further comprising the step of folding the side walls of each tubing structure about the hinge and folding the flexible material between the side walls.

15. The method as set forth in claim 14 further comprising the step of coiling generally half of the folded tubing structures clockwise and generally half the folded tubing structures counterclockwise.

16. A method of forming tubing which has corrugated side walls, the side walls being longitudinally joined near an apex area of the tubing by a hinge means, each side wall terminating opposite the hinge means at a longitudinal terminal edge area, the tubing further having a flexible base connecting the terminal edge areas whereby the side walls are adapted to fold about the hinge means to form a flattened, folded configuration with the terminal edge areas adjacent each other and an open configuration with the terminal edges displaced from each other by the width of the base, the method comprising:

extruding a sleeve of plastic material;

molding the sleeve to form a corrugated generally tubular structure comprising at least four corrugated side walls which are joined longitudinally by the hinge means and by terminal edge areas;

longitudinally splitting the joined terminal edge areas whereby at least two pairs of hinged connected side walls are produced; and attaching a flexible material longitudinally along the terminal edge areas of at least one pair of hinged connected side walls to form a base, whereby the pair of hinged connected side walls and the flexible base connected between the terminal edge areas define the tubing.

17. An apparatus for manufacturing plastic tubing structures for conveying fluids, the tubing structure being hollow in a longitudinal direction and sufficiently rigid in cross section to withstand compressive loading forces when installed in subterranean locations, the apparatus comprising:

extruding means for extruding a sleeve of plastic material;

molding means for molding the extruded sleeve into a generally tubular structure, said molding means including a plurality of mold blocks, said mold blocks having an internal molding surfaces which are adapted to contact the sleeve, at least some of the internal molding surfaces having a generally semiround cross section and a projection to form a hinge means in an apex area of the tubing structure, the mold blocks being adapted to abut together adjacent said extruding means around the extruded sleeve, to travel away from the extruding means with the sleeve conforming to the blocks, and to separate away from the generally tubular structure, whereby the generally tubular structure includes at least two tubing structures having hinge means at their apices and longitudinally connected together adjacent terminal edge areas; and splitting means for splitting the generally tubular structure longitudinally substantially adjacent said terminal edge areas and substantially parallel to the hinge means, whereby the generally tubular structure is split into at least two hinged tubing structures.

18. The apparatus as set forth in claim 17 wherein said molding means further includes pneumatic means for causing the extruded sleeve to conform to the mold blocks.

19. The apparatus as set forth in claim 17 wherein said generally semiround cross section is substantially parabolic.

20. The apparatus as set forth in claim 17 further comprising means for attaching a foldable bottom longitudinally generally along the terminal edges of each tubing structure, whereby the foldable bottom forms a base for the tubing structure.

21. The apparatus as set forth in claim 20 wherein the foldable bottom is a flexible strip of sheet-like material.

22. The apparatus as set forth in claim 21 further comprising folding guides for folding the semiround tubing structures generally flat and a probe for folding the sheet-like material inside the folded semiround tubing structures.

23. The apparatus as set forth in claim 22 further comprising coiling means for coiling the folded tubing structure.

24. An apparatus for manufacturing plastic tubing structures for conveying fluids, the tubing structures being hollow in a longitudinal direction and sufficiently rigid in cross section to withstand compressive loading forces when installed in subterranean locations, the apparatus comprising:

extruding means for continuously extruding a sleeve of plastic material;

molding means disposed adjacent the extruding means for continuously molding the extruded sleeve into a generally tubular structure, the generally tubular structure comprising at least two tubing structures longitudinally connected together adjacent terminal edge areas;

splitting means disposed downstream from the molding means for continuously splitting the generally tubular structure longitudinally substantially adjacent said terminal edge areas, whereby the generally tubular structure is split into at least two tubing structures; and attaching means disposed downstream from the splitting means for continuously attaching a flexible strip of sheet-like material longitudinally generally along the terminal edges of each tubing structure.

25. The apparatus as set forth in claim 24 wherein said attaching means further comprises means for applying a bead of softened plastic material between the flexible strip and the terminal edges.

26. The apparatus as set forth in claim 24 wherein said attaching means comprises a plurality of heat rollers for heat sealing the strip of sheet-like material along each of the terminal edge areas.

27. The apparatus as set forth in claim 24 wherein said attaching means further comprises means for feeding a flexible plastic sheet from a roll, means for splitting the plastic sheet into a plurality of strips, and means for feeding each strip adjacent the terminal edge areas of said structures to be attached to the terminal edge areas.

28. An apparatus for manufacturing corrugated tubing structures, the tubing structures comprising corrugated side walls which are longitudinally connected by a hinge means, the side walls each having terminal edge areas extending longitudinally generally parallel to the hinge means, the side walls being moveable about said hinge means at least between a folded configuration in which the terminal edge areas are generally adjacent and an unfolded configuration in which the side walls define a channel for conveying a fluid, the apparatus comprising:

extruding means for extruding a sleeve of plastic material;

molding means for continuously molding the sleeve to form a generally tubular structure, the generally tubular structure comprising at least two tubing structures, each terminal edge area of each tubing structure being operatively connected with a terminal edge area of another of the tubing structures;

splitting means for splitting the connected terminal edge areas, whereby at least two tubing structures are produced; and attaching means for attaching flexible material longitudinally generally adjacent the terminal edge areas of at least one of the tubing structures, whereby the flexible material forms a base for the tubing structure.

29. The apparatus as set forth in claim 28 further comprising folding means for moving the tubing structure from its unfolded to its folded configuration with the flexible material folded between the side walls.

30. The apparatus as set forth in claim 28 wherein said attaching means further comprises means for feeding a continuous strip of the flexible material longitudinally adjacent the terminal edge areas of each tubing structure.

31. A method of forming generally triangular tubing which has corrugated sidewalls and a generally flat, flexible base, the sidewalls being longitudinally joined near an apex area of the tubing and the flexible base being connected with terminal edge areas of the sidewall which are disposed generally opposite the apex, the method comprising:

extruding a sleeve of plastic material;

molding the sleeve to form a corrugated, generally tubular structure comprising at least four corrugated sidewalls which are joined longitudinally generally at apex and terminal edge areas;

longitudinally splitting the joined terminal edge areas, whereby at least two pairs of connected sidewalls are produced; and, attaching a flexible material longitudinally generally along the terminal edge areas of at least one pair of the longitudinally connected corrugated sidewalls to form the flexible base, whereby the generally triangular tubing with corrugated sidewalls and generally flat, flexible base is defined.

32. An apparatus for manufacturing corrugated, generally triangular tubing structures, the tubing structures comprising corrugated sidewalls which are longitudinally connected generally at an apex area and a generally flat, flexible base which is attached to the corrugated sidewalls generally at terminal edge areas which are disposed opposite the hinge area, the apparatus comprising:

extruding means for extruding a sleeve of plastic material;

molding means for continuously molding the sleeve to form a generally tubular structure, the generally tubular structure comprising at least four corrugated sidewalls longitudinally connected generally at apex and terminal edge areas;

splitting means for splitting the sidewalls connected at terminal edge areas, whereby at least two tubing structures are produced; and, attaching means for attaching flexible material longitudinally generally adjacent the terminal edge areas of at least one of the tubing structures, whereby the flexible material forms the flexible base of the generally triangular tubing structure.

* * * * *

UNITED STATES PATENT AND TRADEMARK OFFICE
CERTIFICATE OF CORRECTION

PATENT NO. : 4,357,190
DATED : November 2, 1982
INVENTOR(S) : Fouss et al

It is certified that error appears in the above—identified patent and that said Letters Patent is hereby corrected as shown below:

On the title page, Item /54/ "NON-ROUND" should read -- FLAT-BASED --.

In column 8, line 49, please delete "last" and insert -- least --.

Signed and Sealed this

Twenty-second Day of February 1983

[SEAL]

Attest:

Attesting Officer

GERALD J. MOSSINGHOFF

Commissioner of Patents and Trademarks